United States Patent
Khayat et al.

(10) Patent No.: US 11,211,865 B2
(45) Date of Patent: Dec. 28, 2021

(54) SERIES CAPACITOR BUCK CONVERTER HAVING CIRCUITRY FOR PRECHARGING THE SERIES CAPACITOR

(71) Applicant: Texas Instruments Incorporated, Dallas, TX (US)

(72) Inventors: Joseph Maurice Khayat, Bedford, NH (US); Sergio Carlo-Rodriquez, Atlanta, GA (US); Michael G. Amaro, Naperville, IL (US); Ramanathan Ramani, Plano, TX (US); Pradeep S. Shenoy, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/799,112

(22) Filed: Feb. 24, 2020

(65) Prior Publication Data
US 2020/0195143 A1 Jun. 18, 2020

Related U.S. Application Data

(63) Continuation of application No. 14/318,289, filed on Jun. 27, 2014, now Pat. No. 10,615,692.
(Continued)

(51) Int. Cl.
*H02M 3/158* (2006.01)
*H02M 3/07* (2006.01)

(52) U.S. Cl.
CPC .............. *H02M 3/158* (2013.01); *H02M 3/07* (2013.01); *H02M 3/1584* (2013.01)

(58) Field of Classification Search
CPC ........ H02M 3/07; H02M 3/158; H02M 3/156; H02M 3/1582; H02M 3/1584; H02M 3/1588; Y02B 70/1466
See application file for complete search history.

(56) References Cited

U.S. PATENT DOCUMENTS 7,319,419 B1    1/2008 Lash et al.
2004/0027101 A1    2/2004 Vinciarelli
(Continued)

OTHER PUBLICATIONS

Nishijima et al., Analysis of Double-Step-Down Two-Phase Buck Converter for VRM, Twenty-Seventh International Telecommunications Conference, 2005, INTELEC 2005, Sep. 2005, Berlin, pp. 497-502.

*Primary Examiner* — Shawki S Ismail
*Assistant Examiner* — Monica Mata
(74) *Attorney, Agent, or Firm* — Mark Allen Valetti; Charles A. Brill; Frank D. Cimino

(57) ABSTRACT

A series capacitor buck converter includes a first half-bridge circuit including a first high side power switch (HSA) and first low side power switch (LSA) connected in series having a first switching node (SWA) therebetween which drives a first output inductor, a second half-bridge circuit including a second HS power switch (HSB) and second LS power switch (LSB) connected in series having a second switching node (SWB) therebetween which drives a second output inductor. A transfer capacitor (Ct) is connected in series with HSA and LSA and between the first and second half-bridge circuits. A first current source is coupled for precharging Ct with a charging current (I_in) and a second current source is coupled to Ct for providing an output current (I_out). A feedback network providing negative feedback forces I_out to match I_in.

14 Claims, 2 Drawing Sheets

Related U.S. Application Data

(60) Provisional application No. 61/984,601, filed on Apr. 25, 2014.

(56) References Cited

U.S. PATENT DOCUMENTS

| | | |
|---|---|---|
| 2004/0041548 A1 | 3/2004 | Perry |
| 2004/0095031 A1 | 5/2004 | Koeneman |
| 2005/0127881 A1 | 6/2005 | Sase et al. |
| 2008/0157732 A1 | 7/2008 | Williams |
| 2012/0062190 A1* | 3/2012 | Haiplik ................ H02M 3/156 323/271 |
| 2014/0002035 A1 | 1/2014 | Chang et al. |

\* cited by examiner

SERIES CAPACITOR BUCK CONVERTER HAVING CIRCUITRY FOR PRECHARGING THE SERIES CAPACITOR

CROSS REFERENCE TO RELATED APPLICATIONS

Under 35 U.S.C. §§ 119(e), 120, this continuation application claims benefits of priority to U.S. Non-provisional patent application Ser. No. 14/318,289, filed on Jun. 27, 2014, which claims the benefits of priority to U.S. Provisional application Ser. No. 61/984,601, filed on Apr. 25, 2014. The above referenced applications are hereby incorporated herein by reference in their entirety.

FIELD

Disclosed embodiments relate to two-phase buck converters.

BACKGROUND

Two-phase pulse width modulation (PWM) DC-DC buck converters use two output inductors, each carrying half the total load current being switched to operate at half the switching frequency. Using two inductors in the output stage also provides the ability to better distribute heat dissipation, which can be a significant problem with high-current output converter designs.

Multi-phase, interleaved, synchronous DC-DC buck converters are commonly used as point-of-load regulators which need to deliver low output voltages and handle fast dynamic load changes. These modular or embedded point-of-load converters, which are known as voltage regulators (VRs), generally regulate output voltages, often as low as 0.6V, which support highly dynamic and fast slew rate current loads. In a majority of applications these VRs are powered from a regulated 12 V input power supply.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include series capacitor buck converters comprising a first half-bridge circuit including a first high side power switch (HSA) and first low side power switch (SWA) connected in series having a first switching node (SWA) therebetween which drives a first output inductor. A second half-bridge circuit including a second HS power switch (HSB) and second LS power switch (LSB) connected in series having a second switching node (SWB) therebetween drives a second output inductor. A transfer capacitor (Ct) is connected in series with HSA and LSA and between the first half-bridge circuit and second half-bridge circuit.

A first current source is coupled for precharging Ct with a charging current (I_in) and a second current source is coupled to Ct for providing an output current (I_out). A feedback network providing negative feedback forces I_out to match I_in through a current tracking mechanism. Forcing I_out to match I_in is recognized to minimize the disturbance on the converter's output voltage, which is helpful particularly if the output voltage is pre-biased.

BRIEF DESCRIPTION OF THE DRAWINGS

Reference will now be made to the accompanying drawings, which are not necessarily drawn to scale, wherein.

DETAILED DESCRIPTION

Figure 1:
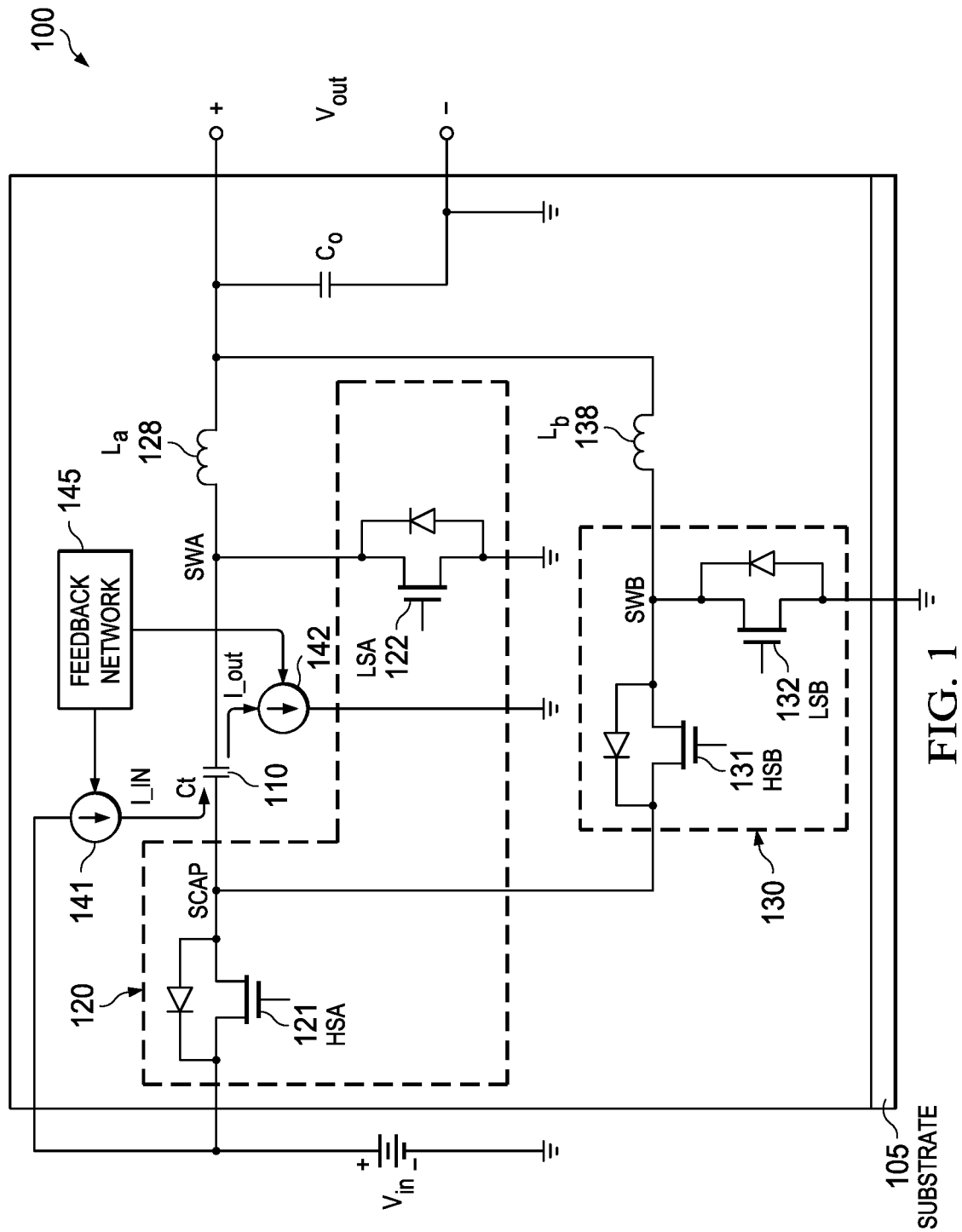
FIG. 1 is an example series capacitor buck converter that includes a Ct connected in series with HSA and LSA and between a first half-bridge circuit and a second half-bridge circuit, and feedback comprising precharge circuitry including a first current source providing I_in, a second current source providing I_out, a feedback network providing negative feedback for forcing I_out to match I_in, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows an example series capacitor buck converter 100 that includes a Ct 110 between a first half-bridge circuit 120 and a second half-bridge circuit 130, and feedback comprising precharge circuitry according to an example embodiment. The feedback comprising precharge circuitry includes a first current source 141 that provides I_in, a second current source 142 that provides I_out, and a feedback network 145 which provides negative feedback. The first current source 141 is coupled for precharging Ct 110 at a first node shown as SCAP with I_in, and the second current source 142 coupled to Ct 110 at a second node shown as SWA for sinking I_out to ground. As described in more detail below, the feedback network 145 is configured to force I_in and I_out to match so that during precharging of Ct 110 (before converter switching operations commence) the precharging proceeds essentially without disturbing the Vout prebias. During precharging operations, Vin is applied, a prebias Vout is generally present, but no gate drive signals are applied to the power switches.

Series capacitor buck converter 100 is shown as a monolithic integrated circuit (IC) that is formed in and on a substrate 105, such as a silicon comprising substrate including bulk silicon or silicon epi on a bulk silicon substrate. The substrate 105 may also generally comprise other materials, such as elementary semiconductors besides silicon including germanium. Substrate 105 may also generally comprise a compound semiconductor such as silicon carbide, gallium arsenide, indium arsenide, or indium phosphide. Moreover, substrate 105 may also generally comprise an alloy semiconductor such as silicon germanium, silicon germanium carbide, gallium arsenic phosphide, and gallium indium phosphide. The gate driver circuitry and/or control logic can also be formed on the substrate 105 for driving the gates of the power switches in the respective half-bridges but is not shown in FIG. 1 for simplicity to avoid obscuring inventive details.

First half-bridge circuit 120 provides one phase shown as phase A which drives a first output inductor 128 shown as La, and the second half-bridge circuit 130 provides phase B which drives a second output inductor 138 shown as Lb. The first output inductor 128 and second output inductor 138 both drive the output of the series capacitor buck converter 100 shown as Vout that is developed across the output capacitor (Co) shown and ground. In steady state operation the series capacitor buck converter 100 each output inductor 128, 138 carries half the total load current and operates at half the switching frequency. Output inductors 128, 138 can be embodied as integrated inductors on the monolithic IC described above.

First half-bridge circuit 120 is shown including a HSA 121 and a LSA 122 both shown as MOSFET switches. Ct 110 prevents a direct connection of HSA 121 and LSA 122, with a SWA (switch A) node on the reference side of Ct 110 and a high side node of Ct 110 shown as SCAP (series capacitor). The second half-bridge circuit 130 includes HSB 131 and LSB 132 both shown as MOSFET switches that are directly connected together with the SWB node directly in between.

The power switches HSA 121, LSA 122, HSB 131 and LSB 132 are shown as conventionally configured MOSFETs having their body diodes parallel to their source-to-drain path by shorting the source to the body of the MOSFET. MOSFETs for HSA 121 and HSB 131 may be n-channel or p-channel, with n-channel devices generally providing better performance due to a lower on-resistance.

Since Ct 110 is in series in the first half-bridge circuit 120, during steady state operation of the series capacitor buck converter 100, Ct 110 holds charge and the voltage is close to half the input supply voltage, Vin, that powers the series capacitor buck converter 100 as shown in FIG. 1. A typical capacitance range for Ct 110 is 0.1 µF to 10 µF. Ct 110 can be a monolithic capacitor integrated on the same substrate as the power switches (HSA 121, LSA 122, HSB 131, LSB 132) in a technology that offers high density monolithic capacitors A monolithic capacitor is defined in the art and defined herein to be a capacitor in which the layers of electrodes and dielectric(s) are bonded together in a unitary structure as opposed, for example, to a metallized film capacitor in which self-supporting films are rolled or wound into the capacitor form. The monolithic capacitor can comprise a multi-layer chip capacitor (sometimes labeled MLCCs), that are known to provide high density ceramic capacitors.

Given that Ct 110, as shown in FIG. 1, holds approximately a voltage equal to half of Vin in steady state, SWA and SWB operate to about half of Vin in steady state. This provides for a reduced $V_{DS}$ voltage during switching, leading to less switching loss and the ability to utilize lower drain-to-source breakdown voltage ($BV_{DSS}$) power switches. This ability to use lower $BV_{DSS}$ power switches, is applicable to LSA 22 and LSB 132. HSA 121 and HSB 131 generally require full Vin supply $BV_{DSS}$ rating, either when Ct 110 voltage is initially zero, or during switching, respectively. Moreover, the addition of Ct 110 as shown provides inherent phase current balancing and an extended duty ratio.

However, it is recognized that Ct 110 should be precharged before converter operations are begun because during startup Ct 110 has a net of zero volts across it. Should switching start when voltage across Ct 110 is zero, LSA 122 can become overstressed. Thus a Ct precharging circuit can be used to avoid overstress of LSA 122, such as shown in FIG. 1 whereby I_in precharges Ct 110 before steady state converter operation commences.

Furthermore, during precharging for applications including a Vout prebias, precharging current that flows through first output inductor 128 should be minimized. It is thus recognized that without proper management of I_in, current will flow through the first output inductor 128 which can result in the prebias Vout being significantly disturbed, which can be a problem in some prebias system configurations.

Although a first current source 141 that provides I_in can be applied to the SCAP node into Ct 110 and simply have the current pulled out of the SWA node by a second current source 142 as I_out to ground, without a disclosed feedback network 145, this arrangement is recognized to generally be straightforward but not be accurate, since it involves trying to match current sources I_in and I_out at different compliance levels, and potentially at a low compliance voltage when Vout is zero or at a prebias level. Feedback network 145 having negative feedback forces matching of I_in and I_out so that differences in compliance levels and other errors sources will be minimized.

One example of a feedback network 145 for is a servo loop including an amplifier with negative feedback for forcing I_out to match I_in while keeping Vout at a stable level to avoid disturbing the prebias Vout level. The servo loop can modulate I_out through a set of amplifiers and actively (with a MOSFET current sink) and generally accurately sink I_out. The servo loop can be embodied as either a current servo loop or a voltage servo loop. The voltage servo loop has the advantage of smaller die area, while the current server loop has the advantage of higher accuracy.

Figure 2:
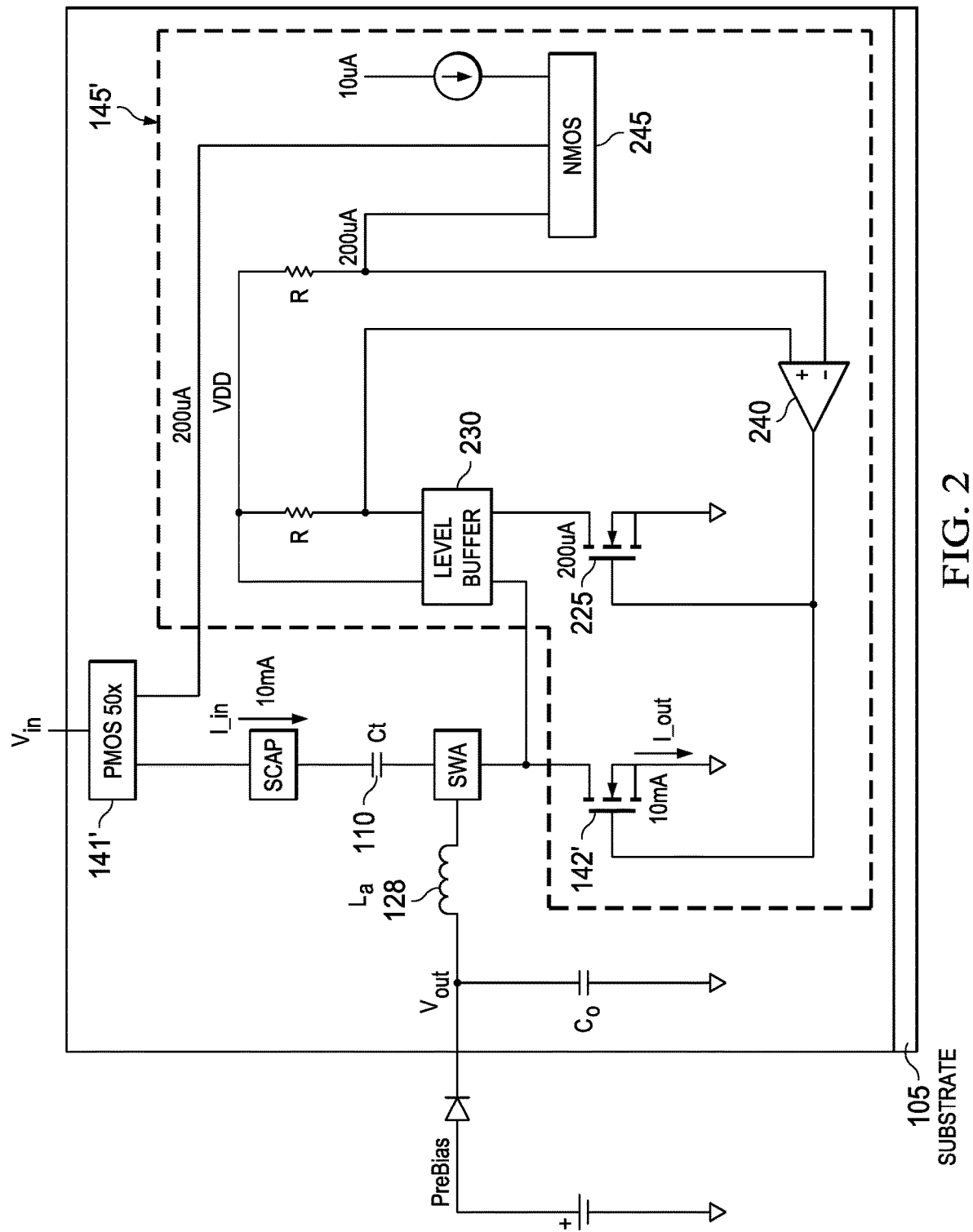
FIG. 2 shows an example current servo loop for precharging Ct essentially without disturbing an existing level on Vout (Vout prebias), according to an example embodiment.

FIG. 2 shows an example current servo loop 145' for precharging Ct 110 essentially without disturbing the Vout prebias level (shown as "Prebias"), according to an example embodiment. The current servo loop 145' is shown in and on substrate 105 which can be monolithically integrated on a monolithic IC including substrate 105 along with the power switches HSA 121, LSA 122, HSB 131 and LSB 132, the first current source shown as a p-channel MOSFET 141', second current source shown as an n-channel MOSFET 142', Ct 110 shown in FIG. 1, along with gate drivers and/or control logic.

As shown in FIG. 2, a 10 mA (or any other suitable value) current is forced into the SCAP node (high side) of Ct 110 by the MOSFET 141' of the first current source shown as a 50 x p-channel MOSFET receiving a 200 µA bias current from a 1 x n-channel MOSFET 245 bias transistor provided by current servo loop 145'. However, the listed currents and scaling ratios of the MOSFETs shown in FIG. 2 are only provided as a specific example, and various other currents and ratios may also be used.

The MOSFET 142' of the second current source in FIG. 1A which provides I_out is shown as an n-channel MOSFET that sinks the 10 mA I_in fed to the SWA node (by MOSFET 141' of the first current source) accurately leaving little if any current from the example 10 mA I_in flowing in the first output inductor 128 which minimizes the disturbance on Vout during charging of Ct 110. Ct 110 is thus able to be precharged whereby the applied charging current I_in is accurately matched by I_out which is shunted to ground preventing residual current from flowing in the inductor 128 and disturbing a prebias Vout.

MOSFET 142' of the second current source in FIG. 2 is thus the main current sink transistor to ground with its source being connected to ground. A current sampling MOSFET in current servo loop 145' referred to herein as a "matched MOSFET" 225 shown as an n-channel MOSFET is matched (i.e., is in a ratio) with respect to the MOSFET 142' of the second current source which samples the current in second current source. A level shift amplifier buffer (shown as a "level buffer") 230 has a first output connected to the drain of the MOSFET 142' of the second current source and a second output connected to the drain of matched MOSFET 225.

The level buffer 230 is configured to ensure that the drain voltage of the MOSFET 142' of the second current source matches the drain voltage of matched MOSFET 225. Only when these drain voltages are essentially equal, the ratio of the current between matched MOSFET 225 to the MOSFET 142' of second current source will be accurately maintained. Having both of these drain voltages equal is recognized to be important when both MOSFETs 225 and 142 operate in the linear region. Through the level buffer 230 shown, current from matched MOSFET 225 is extracted and is compared to a reference current that established the 10 mA I_in shown provided by MOSFET 141' of the first current source.

The amplifier 240 in FIG. 2 is shown as an operational amplifier having inverting and non-inverter input voltages developed at their respective input resistors, both having an equal resistance R. The sampled current in matched MOSFET 225 and the reference current are compared by amplifier 240 and the output of the amplifier 240 is connected to the gate of the MOSFET 142' of the second current source and to the gate of the matched MOSFET 225. This arrangement modulates the voltage on theses gates to ensure that the MOSFET 142' of the second current source conducts a current (I_out) that matches the 10 mA example sourced current (I_In) that charges Ct 110, thus providing negative feedback for forcing I_out to match I_in.

The servo loop 145' shown in FIG. 2 can also be embodied through other approaches. For example, instead of sensing currents in the MOSFET 142' of the second current source and matched MOSFET 225, another circuit implementation can sense the current in the MOSFET 142' of the second current source via a sense resistor whose voltage can be compared to a reference voltage. A similar servo loop can regulate the gate of MOSFET 142' that satisfies the sense voltage via a sense resistor to match the reference voltage.

Advantage of disclosed embodiments include a precharge architecture for precharging Ct 110 for series capacitor buck converters before switching operation in its application, where the applied charging current (I_in) is matched with a sink current (I_out) accurately irrespective of Vout so that is shunted to ground preventing residual current from flowing in the output inductor. As a result, a prebias $V_{OUT}$ will essentially not be disturbed, with a typical compliance level of <150 mV. Furthermore, precharging Ct 110 ensures that the operating steady state on Ct is reached before PWM switching begins. This ensures that rated voltages on the MOSFETs for LSA 122 and LSB 132 are not violated at the beginning of switching.

Disclosed embodiments can be used to form semiconductor die and semiconductor devices that may be integrated into a variety of assembly flows to form a variety of different devices and related products. The semiconductor die may include various elements therein and/or layers thereon, including barrier layers, dielectric layers, device structures, active elements and passive elements including source regions, drain regions, bit lines, bases, emitters, collectors, conductive lines, conductive vias, etc.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A buck converter, comprising:
   a first high side power switch having a current path coupled between a first terminal and a second terminal;
   a first low side power switch having a current path coupled between a third terminal and a power terminal;
   a capacitor having a first capacitor terminal connected to the second terminal and having a second capacitor terminal connected to the third terminal, wherein the capacitor is coupled between the first high side power switch and the first low side power switch to prevent a direct connection between the first high side power switch and the first low side power switch;
   a second high side power switch having a current path coupled between the second terminal and a fourth terminal;
   a second low side power switch having a current path coupled between the fourth terminal and the power terminal; and
   a first current source to provide a first current to the second terminal.

2. The buck converter of claim 1, wherein each of the first and second low side power switches comprise n-channel transistors.

3. The buck converter of claim 1, wherein each of the first and second high side power switches comprise n-channel transistors.

4. The buck converter of claim 1, wherein the first terminal is coupled to receive an input voltage, and the buck converter is configured to precharge the capacitor to a voltage equal to one half of the input voltage.

5. The buck converter of claim 1, wherein the first terminal is coupled to receive an input voltage, and the buck converter is configured to operate each high side and low side power switch at a respective voltage range of zero to one half of the input voltage.

6. The buck converter of claim 1, further comprising:
   a first inductor having a current path between the third terminal and an output terminal.

7. The buck converter of claim 6, further comprising:
   a second inductor having a current path between the fourth terminal and the output terminal.

8. The buck converter of claim 6, further comprising an output capacitor coupled between the output terminal and the power terminal.

9. The buck converter of claim 1, further comprising:
   a second current source to provide a second current matching the first current from the third terminal to the power terminal.

10. The buck converter of claim 9, further comprising a feedback network to sample the first current and adjust the second current to match the first current.

11. The buck converter of claim 9, further comprising a feedback network coupled as a current servo loop to sample the first current and adjust the second current to match the first current.

12. The buck converter of claim 9, wherein the first current source comprises a p-channel transistor, and the second current source comprises an n-channel transistor.

13. The buck converter of claim 9, wherein the second current source comprises a first n-channel transistor, and the buck converter further comprises:
- a second n-channel transistor to conduct a current proportional to the second current; and
- a level buffer circuit to monitor a respective drain voltage of each of the first and second n-channel transistors.

14. The buck converter of claim 9, wherein the second current source comprises a first n-channel transistor, and the buck converter further comprises:
- a second n-channel transistor to conduct a current proportional to the second current; and
- an amplifier coupled to receive a first voltage in response to a first sample current proportional to the first current and a second voltage in response to a second sample current proportional to the second current, wherein the amplifier is further coupled to apply an output voltage to a respective control gate of each of the first and second n-channel transistors.

* * * * *